United States Patent
Yamaguchi et al.

(10) Patent No.: US 7,617,038 B2
(45) Date of Patent: Nov. 10, 2009

(54) CONTROL SYSTEM FOR INTERNAL COMBUSTION ENGINE

(75) Inventors: Satoshi Yamaguchi, Wako (JP); Mamoru Hasegawa, Wako (JP); Naoto Kitayama, Wako (JP); Hideki Sakamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 210 days.

(21) Appl. No.: 11/905,538

(22) Filed: Oct. 2, 2007

(65) Prior Publication Data

US 2008/0103671 A1 May 1, 2008

(30) Foreign Application Priority Data

Oct. 31, 2006 (JP) .............................. 2006-296156

(51) Int. Cl.
*G06F 19/00* (2006.01)
*F02D 41/30* (2006.01)
*F02D 41/04* (2006.01)

(52) U.S. Cl. ....................................... 701/103; 123/435

(58) Field of Classification Search ......... 701/101–105, 701/110, 111, 114, 115; 123/435, 478, 480, 123/494; 73/114.38, 114.52, 114.53
See application file for complete search history.

(56) References Cited

U.S. PATENT DOCUMENTS

| | | | | |
|---|---|---|---|---|
| 5,732,681 | A * | 3/1998 | Ogita | 123/492 |
| 6,073,611 | A * | 6/2000 | Ohuchi et al. | 123/435 |
| 6,769,388 | B2 * | 8/2004 | Watanabe et al. | 123/179.18 |
| 7,480,557 | B2 * | 1/2009 | Yamaguchi et al. | 701/104 |
| 7,509,932 | B2 * | 3/2009 | Hara et al. | 123/90.15 |
| 7,519,467 | B2 * | 4/2009 | Katoh | 701/103 |
| 2008/0262699 | A1 * | 10/2008 | Hasegawa et al. | 701/103 |

FOREIGN PATENT DOCUMENTS

JP 2005-171818 A 6/2005

* cited by examiner

*Primary Examiner*—Willis R Wolfe, Jr.
(74) *Attorney, Agent, or Firm*—Arent Fox LLP

(57) ABSTRACT

A control system for an internal combustion engine wherein a load applied to the engine from at least one auxiliary component and/or an air conditioner, which are both driven by the engine, is reduced when the engine is operating in a predetermined low-load operating state. A property of the fuel in use is estimated based on a combustion state of the injected fuel after the reduction of the load applied to the engine.

8 Claims, 5 Drawing Sheets

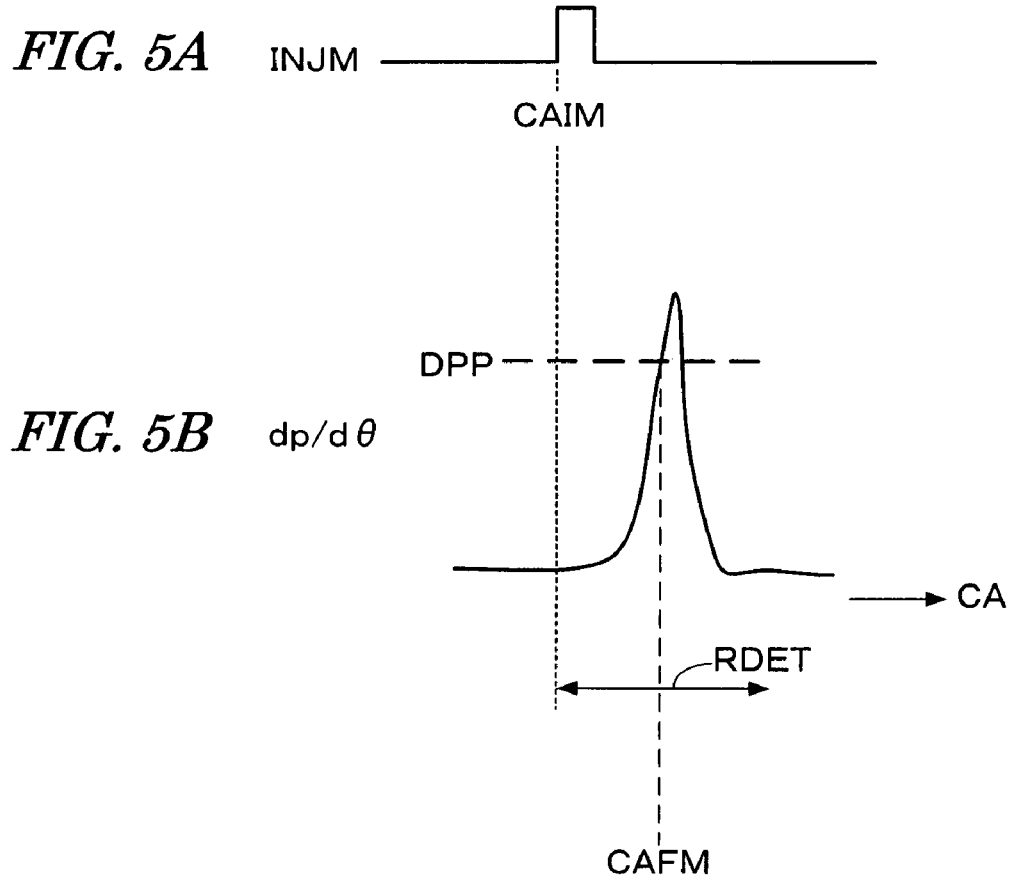
FIG. 5A
FIG. 5B
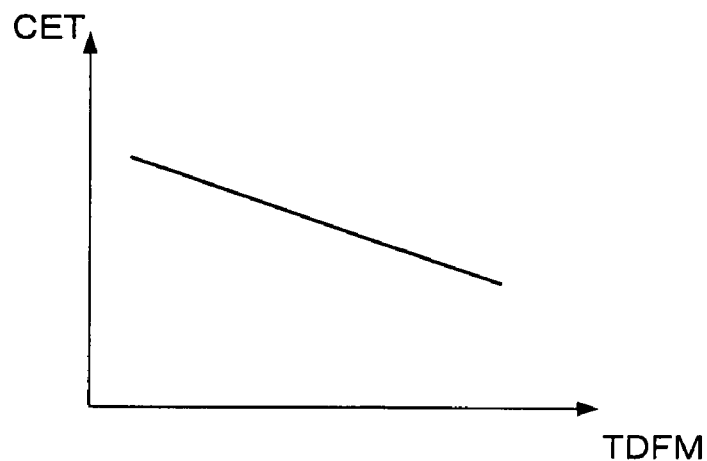
FIG. 6

CONTROL SYSTEM FOR INTERNAL COMBUSTION ENGINE

BACKGROUND OF THE INVENTION

1. Field of the Invention

The present invention relates to a control system for an internal combustion engine and, particularly, to a control system which estimates a property of a fuel in use.

2. Description of the Related Art

Japanese Patent Laid-open No. 2005-171818 (JP '818) discloses a control system for a compression ignition internal combustion engine in which a premix combustion is performed. According to the disclosed control system, an actual ignition timing of fuel is detected when the premix combustion is performed, and a property of the fuel in use is determined according to an ignition timing error and differences in the ignition timing error. The ignition timing error is a difference between the detected actual ignition timing and a previously set reference fuel ignition timing.

When determining a fuel property based on a combustion state of the injected fuel, it is preferable to maintain the fuel injection amount at a constant value in order to avoid degrading the accuracy of the determination. However, there is a possibility that the combustion state may change due to a load applied to the engine from an air conditioner or auxiliaries influencing the combustion state. Such a situation would likely reduce the accuracy of the determination since the engine operating region where the premix combustion is performed is a low-load operating region where a demand torque TRQ of the engine is comparatively low. An example is shown in FIG. 7.

Further, the operating region shown in FIG. 7 is comparatively narrow compared with the entire engine operating region. Therefore, the inventor of the invention disclosed herein studied the issue of determining fuel property during an idling state of the engine. A result of the study is that there is a problem described below. That is, it is necessary in the idling state of the engine to control the fuel injection amount so that an engine rotational speed is substantially kept constant. With respect to the cylinder in which the estimation of fuel property is performed, estimation accuracy of the fuel property will decrease if the fuel injection amount is not maintained at a constant level. In this case, when using one cylinder for estimating the fuel property, for example, in a four-cylinder engine, it is necessary to keep the engine rotational speed substantially constant by controlling the fuel injection amount in the remaining three cylinders. If an air conditioner and/or the like driven by the engine are/is operating, the difference between a torque generated by the cylinder which is subjected to the fuel property estimation and the torque of the other cylinders becomes great in order to keep the engine rotational speed substantially constant, which also causes unpleasant vibrations.

SUMMARY OF THE INVENTION

The present invention was made contemplating the above-described points, and an aspect of the invention is to provide a control system for an internal combustion engine which performs a process for estimating a property of the fuel in use while the engine is in a low-load operating state and obtains an accurate estimation result.

To attain the above-described aspect, the present invention provides a control system for an internal combustion engine having a fuel property estimating means and a load reducing means. The fuel property estimating means injects fuel into a combustion chamber of the engine and estimates a property of the fuel based on a combustion state of the injected fuel. The load reducing means reduces a load applied to the engine from at least one auxiliary component and an air conditioner, which are driven by the engine, when the fuel property estimating means performs the estimation of the fuel property in a predetermined low-load operating state of the engine.

With the above-described structural configuration, when the engine is in the predetermined low-load operating state and the estimation of the fuel property is performed by the fuel property estimating means, the load applied to the engine from at least one of the auxiliary components and the air conditioner driven by the engine is reduced. Consequently, the influence of the load applied from the auxiliary components and/or the air conditioner is reduced and the estimation accuracy of the fuel property is improved.

Preferably, the fuel property estimating means includes ignition timing detecting means for detecting a compression ignition timing (CAFM) of the injected fuel and performs the estimation of the fuel property based on the detected compression ignition timing (CAFM).

With the above-described structural configuration, the compression ignition timing of the injected fuel is detected, and the estimation of the fuel property is performed based on the detected compression ignition timing. If the fuel property is different, a time period from the time when a fuel injection is performed to the time the injected fuel is ignited changes. Therefore, the fuel property is estimated based on the detected compression ignition timing.

Preferably, the fuel property estimating means performs the estimation of the fuel property during an idling state of the engine.

With the above-described structural configuration, the estimation of the fuel property is performed during the idling state of the engine. Therefore, estimation of the fuel property is performed, for example, during the idling state immediately after refueling. Accordingly, the estimation of the fuel property is performed quickly after refueling.

Preferably, the control system further includes inhibiting means for inhibiting the operation of the fuel property estimating means when the load applied to the engine is greater than a predetermined load.

With the above-described structural configuration, when the load applied to the engine from the auxiliary components and/or the air conditioner is greater than the predetermined load, the fuel property estimation is inhibited. When the load applied on the engine from the auxiliary components and/or the air conditioner is great, accuracy of the fuel property estimation is greatly reduced. Therefore, erroneous estimation of the fuel property is prevented by inhibiting the fuel property estimation process from taking place.

BRIEF DESCRIPTION OF THE DRAWINGS

FIGS. 5A-5B are time charts illustrating a detecting method of the ignition timing;

FIG. 6 illustrates a table used for calculating a cetane number (CET) from an ignition delay time period (TDFM)

DETAILED DESCRIPTION OF THE PREFERRED EMBODIMENTS

Preferred embodiments of the present invention will now be described with reference to the drawings.

Figure 1:
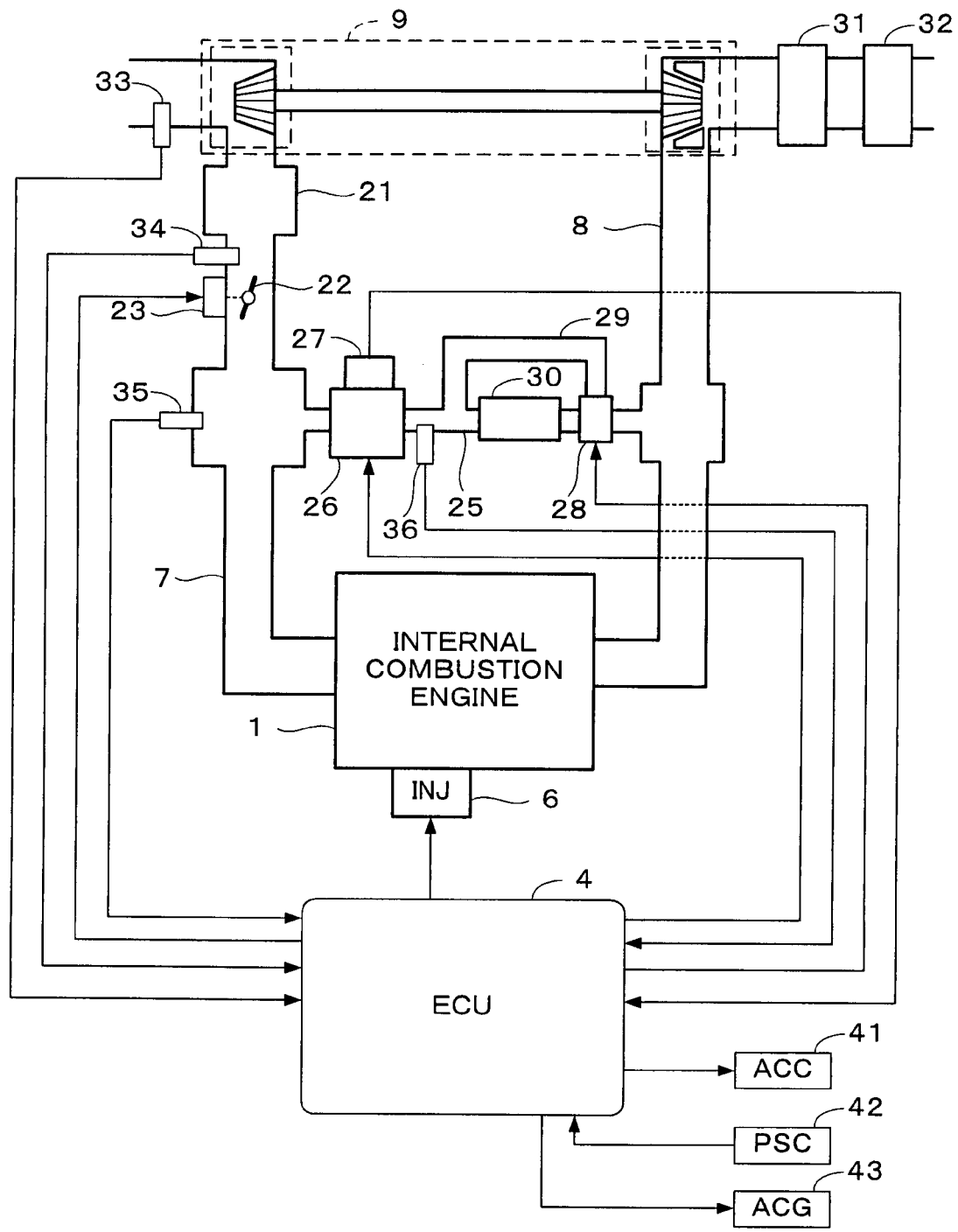
FIG. 1 is a schematic diagram of an internal combustion engine and a control system therefor according to one embodiment of the present invention.
Figure 2:
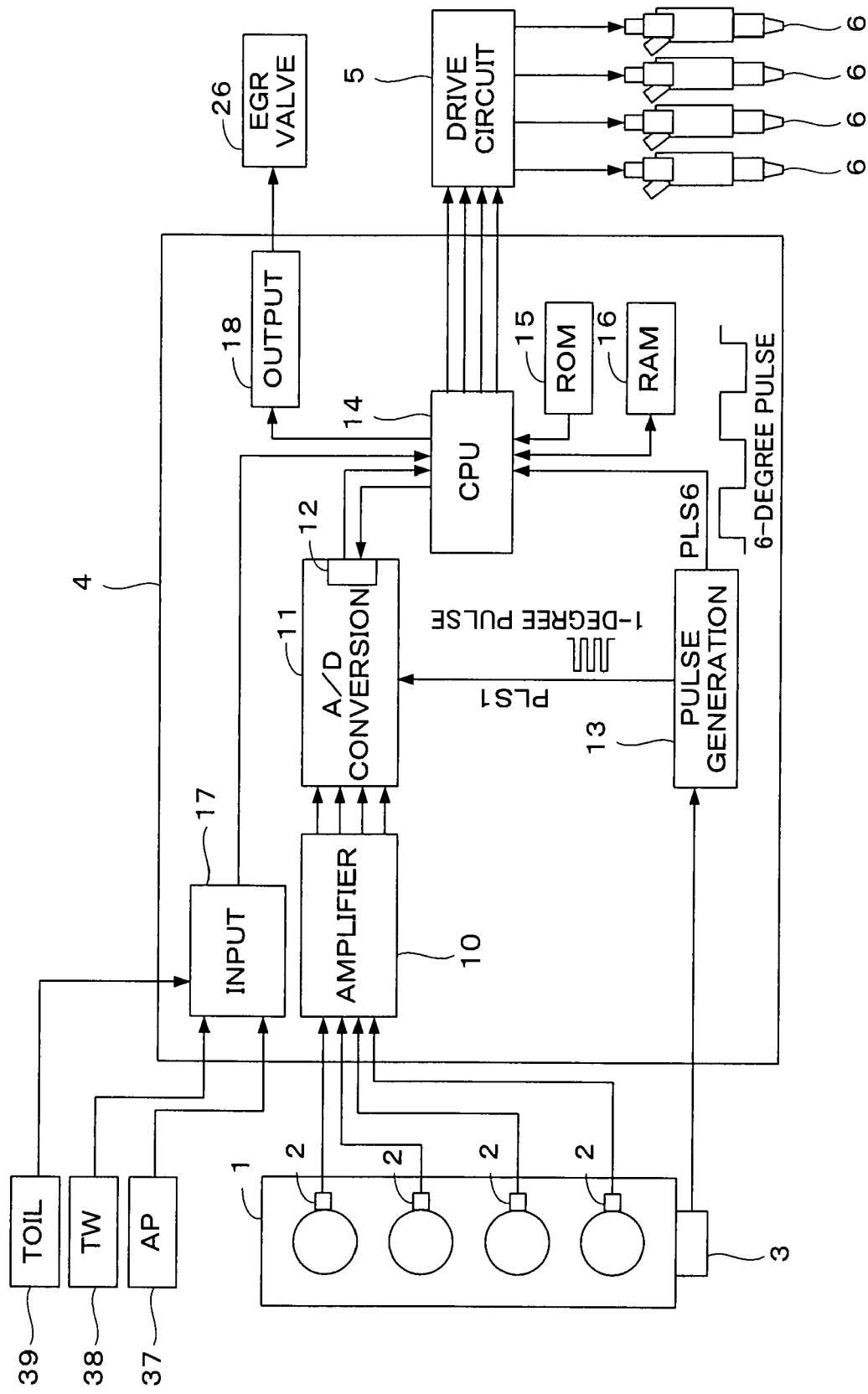
FIG. 2 is a schematic diagram showing a configuration of a part of the control system shown in FIG. 1.

FIGS. 1 and 2 are schematic diagrams of an internal combustion engine and a control system therefor according to one embodiment of the present invention. The embodiment will be described referring to both figures. The internal combustion engine 1 (hereinafter referred to as "engine") is a diesel engine wherein fuel is injected directly into the cylinders. Each cylinder is provided with a fuel injection valve 6. In the engine 1, the injected fuel is ignited by compressing an air-fuel mixture. The fuel injection valve 6 is electrically connected to an electronic control unit 4 (hereinafter referred to as "ECU 4"). The ECU 4 controls a valve opening timing and valve opening period of each fuel injection valve 6. That is, the fuel injection timing and fuel injection period are controlled by the ECU 4.

The engine 1 has an intake pipe 7, an exhaust pipe 8, and a turbocharger 9. The turbocharger 9 includes a turbine that is rotationally driven by the kinetic energy of exhaust gases and a compressor that is connected to the turbine via a shaft. The turbocharger 9 pressurizes (compresses) the intake air of the engine 1.

The intake pipe 7 is provided with an intercooler 21 downstream of the compressor and a throttle valve 22 downstream of the intercooler 21. The throttle valve 22 is configured to be actuated to open and close by an actuator 23 connected to the ECU 4. The ECU 4 performs an opening control of the throttle valve 22 through the actuator 23.

An exhaust gas recirculation passage 25 for recirculating exhaust gases to the intake pipe 7 is provided between the exhaust pipe 8 and the intake pipe 7. The exhaust gas recirculation passage 25 is provided with a recirculated exhaust gas cooler 30 for cooling recirculated exhaust gases, a bypass passage 29 for bypassing the recirculated exhaust gas cooler 30, a switching valve 28, and an exhaust gas recirculation control valve 26 (hereinafter referred to as "EGR valve"). The switching valve 28 switches between a state where the exhaust gas recirculation passage 25 is connected to the recirculated exhaust gas cooler 30 and a state where the exhaust gas recirculation passage 25 is connected to the bypass passage 29. The EGR valve 26 is an electromagnetic valve having a solenoid. A valve opening of the EGR valve 26 is controlled by the ECU 4. The exhaust gas recirculation passage 25, the recirculated exhaust gas cooler 30, the bypass passage 29, the switching valve 28, and the EGR valve 26 define an exhaust gas recirculation mechanism. The EGR valve 26 is provided with a lift sensor 27 for detecting a valve opening LACT (valve lift amount) of the EGR valve 26. The detection signal of the lift sensor 27 is supplied to the ECU 4.

An intake air amount flow rate 33, a boost pressure sensor 34, and an intake pressure sensor 35 are disposed in the intake pipe 7. The intake air amount sensor 33 detects an intake air flow rate GA. The boost pressure sensor 34 detects an intake pressure PB (boost pressure) on the downstream side of the compressor. The intake pressure sensor 35 detects an intake pressure PI. A recirculated exhaust gas temperature sensor 36 is disposed in the exhaust gas recirculation passage 25. The recirculated exhaust gas temperature sensor 36 detects a temperature TEGR of recirculated exhaust gases. The sensors 33 to 36 are connected to the ECU 4, and the detection signals from the sensors 33 to 36 are supplied to the ECU 4.

A catalytic converter 31 and a particulate filter 32 are disposed downstream of the turbine in the exhaust pipe 8. The catalytic converter 31 promotes oxidation of hydrocarbon and CO in the exhaust gases. The particulate filter 32 traps particulate matter which mainly consists of soot.

The ECU 4 is connected to an air conditioner control unit 41 for controlling an air conditioner (not shown), a power steering control unit 42 for controlling a power steering device, and an AC generator 43 (hereinafter referred to as "ACG"). A compressor of the air conditioner is driven by the engine 1 through a clutch. Further, the power steering device is provided with a motor for assisting with a steering operation. The motor is one of the loads acting on the engine 1 through the ACG 43. When the power steering device is operating, the power steering control unit 42 supplies a signal to the ECU 4 indicating the power steering device is operating. The ACG 43 is rotationally driven by the engine 1 and generates electric power. The electric power output from the ACG 43 charges a battery and is supplied to various electrical devices mounted on the vehicle. The ACG 43 is configured to operate in a high-voltage mode and a low-voltage mode by switching the field current.

Each cylinder of the engine 1 is provided with a cylinder pressure sensor 2 for detecting a cylinder pressure (a pressure in the combustion chamber of the engine 1). In this embodiment, the cylinder pressure sensor 2 is configured in one body together with the glow plug disposed in each cylinder. The detection signal of the cylinder pressure sensor 2 is supplied to the ECU 4. It is to be noted that the detection signal of the cylinder pressure sensor 2 corresponds to a differential signal of the cylinder pressure PCYL (a change in the cylinder pressure) with respect to the crank angle (time). The cylinder pressure PCYL is obtained by integrating the output of the cylinder pressure sensor.

The engine 1 is provided with a crank angle position sensor 3 for detecting a rotation angle of the crankshaft (not shown) of the engine 1. The crank angle position sensor 3 generates one pulse at every one degree of the crank angle, and the pulse is then supplied to the ECU 4. The crank angle position sensor 3 further generates a cylinder discrimination pulse at a predetermined crank angle for a specific cylinder of the engine 1 and then supplies the cylinder discrimination pulse to the ECU 4.

An accelerator sensor 37 for detecting an operation amount AP of an accelerator pedal of the vehicle driven by the engine 1, a coolant temperature sensor 38 for detecting a coolant temperature TW of the engine 1, an oil temperature sensor 39 for detecting a temperature TOIL of lubricating oil of the engine 1, an oxygen concentration sensor (not shown) for detecting an oxygen concentration in exhaust gases, an intake air temperature sensor (not shown), and the like, are connected to the ECU 4. The detection signals of these sensors are supplied to the ECU 4.

The ECU 4 provides a control signal of the fuel injection valve 6, located in the combustion chamber of each cylinder, to a drive circuit 5. The drive circuit 5 is connected to the fuel injection valve 6 and supplies the driving signals to the fuel injection valve 6. Fuel is thereby injected into the combustion chamber of each cylinder at the fuel injection timing in accordance with the control signal output from the ECU 4. The fuel injection amount is controlled to a value in accordance with the control signal from the ECU 4. The ECU 4 normally performs a pilot injection and a main injection with respect to one cylinder.

The ECU 4 includes an amplifier 10; an A/D conversion block 11; a pulse generation block 13; a CPU 14 (Central Processing Unit); a ROM 15 (Read Only Memory) for storing programs executed by the CPU 14; a RAM 16 (Random Access Memory) for storing calculation results, etc.; an input circuit 17; and an output circuit 18. The detection signal of the cylinder pressure sensor 2 is input to an amplifier 10. The amplifier 10 amplifies the input signal. The signal amplified by the amplifier 10 is input to the A/D conversion block 11. The pulse signal output from the crank angle position sensor 3 is input to the pulse generation block 13.

The A/D conversion block 11, which includes a buffer 12, converts the cylinder pressure sensor output from the amplifier 10 to a digital value dp/dθ (hereinafter referred to as "pressure change rate") and stores the converted digital value in the buffer 12. Specifically, a pulse signal PLS1 (hereinafter referred to as "one-degree pulse") having a crank angle period of one degree is supplied to the A/D conversion block 11 from the pulse generation block 13. The cylinder pressure sensor output is sampled at the intervals of the one-degree pulse PLS1 to be converted to a digital value, and the digital value is stored in the buffer 12. The cylinder pressure PCYL is calculated by integrating the pressure change rate dp/dθ.

A pulse signal PLS6 having a crank angle period of six degrees is supplied to the CPU 14 from the pulse generation block 13. The CPU 14 performs a process of reading the digital value stored in the buffer 12 at intervals of the six-degree pulse PLS6. That is, in the present embodiment, the A/D conversion block 11 does not request an interrupt of the CPU 14, but the CPU 14 performs the reading process at intervals of the six-degree pulse PLS6.

The input circuit 17 converts the detection signals from the various sensors to digital values and supplies the digital values to the CPU 14. An engine rotational speed NE is calculated from the time period of the six-degree pulse PLS6. A demand torque TRQ of the engine 1 is calculated according to the operation amount AP of the accelerator pedal.

The CPU 14 calculates a target exhaust gas recirculation amount GEGR according to the engine operating condition and supplies a duty control signal for controlling an opening of the EGR valve 26 according to the target exhaust gas recirculation amount GEGR to the EGR valve 26 through the output circuit 18. Further, the CPU 14 executes a process which estimates a cetane number of the fuel in use, as described below, and performs a fuel injection control according to the estimated cetane number.

Figure 3:
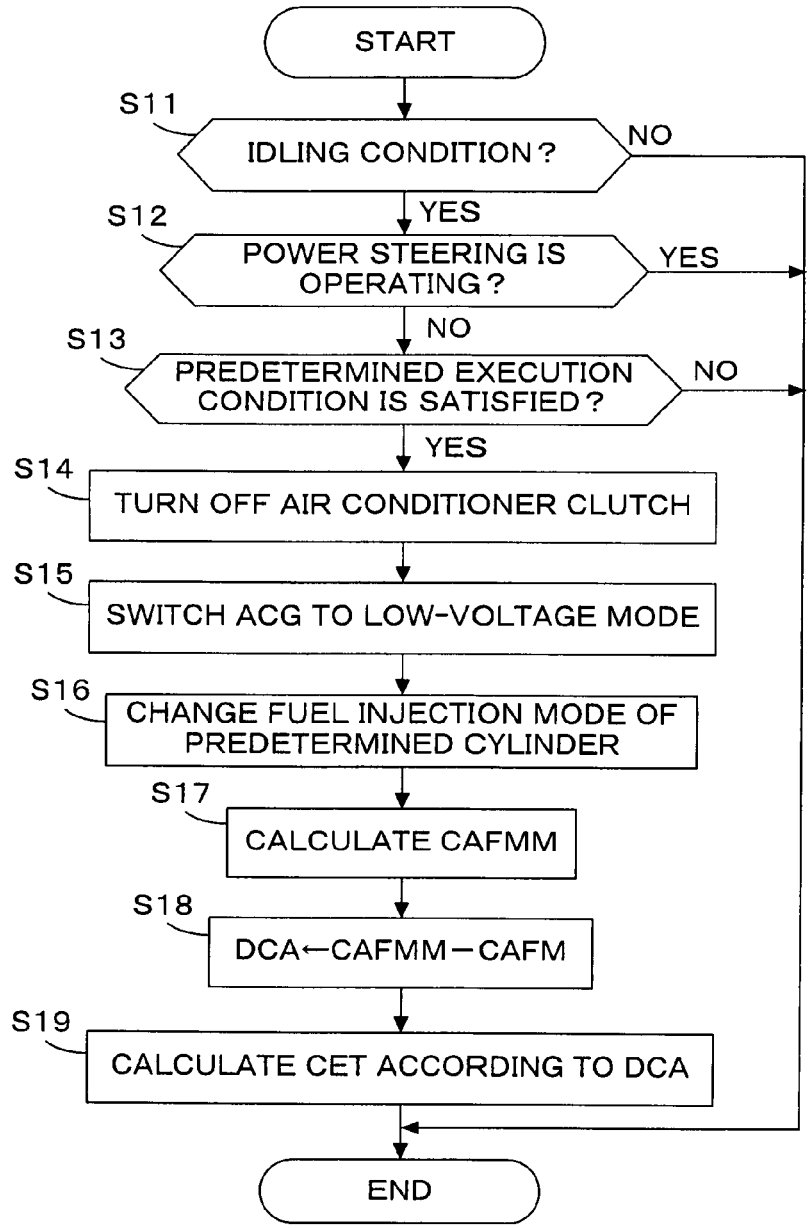
FIG. 3 is a flowchart showing a process for estimating a cetane number of the fuel in use.

FIG. 3 is a flowchart showing a cetane number estimation process. In step S11, it is determined whether the engine 1 is in an idling state. If the answer to step S11 is affirmative (YES), it is determined whether the power steering device is operating (step S12). If the power steering device is operating, it is determined that the load on the engine 1 is equal to or greater than a predetermined load, and the process ends without performing the cetane number estimation. The process immediately ends also when the engine 1 is not in the idling state.

When the power steering is not operating, it is determined whether a predetermined execution condition for stably performing the cetane number estimation is satisfied (step S13). The predetermined execution condition is satisfied, for example, when the recirculated exhaust gas temperature TEGR is equal to or greater than a predetermined temperature TE0 (e.g., about 90 degrees Centigrade) and either the coolant temperature TW or the oil temperature TOIL, which is indicative of a warm-up state of the engine 1, is equal to or greater than a predetermined temperature TWUP (e.g., 80 degrees Centigrade). If the answer to step S13 is negative (NO), the process immediately ends without performing the cetane number estimation. If the predetermined execution condition is satisfied in step S13, a command signal for disengaging the clutch of the air conditioner (air-conditioner) is supplied to the air conditioner control unit 41 (step S14). Accordingly, the load on the engine 1 from the air conditioner is removed. Further, in step S15, the ACG 43 is switched to the low-voltage mode. Consequently, the load from the ACG 43 on the engine 1 is reduced.

In step S16, a fuel injection mode of the predetermined cylinder (e.g., #1 cylinder), which is subjected to the cetane number estimation, is changed. Specifically the pilot injection is stopped, i.e., the injection mode is switched to a single injection mode in which only the main injection is performed, and the main injection timing is changed in the advancing direction with respect to the timing of the normal control. Thus, the difference in the ignition timing due to the difference in the cetane number is easily detected by switching the fuel injection mode to the single injection mode and the fuel injection timing is advanced with respect to the timing of the normal control.

In step S17, a CAFMM map (not shown) is retrieved according to the engine rotational speed NE and the demand torque TRQ to calculate a reference ignition timing CAFMM. The CAFMM map is set based on the fuel of an average cetane number (e.g., 47). In step S18, an ignition delay angle DCA is calculated by subtracting an actual ignition timing CAFM from the reference ignition timing CAFMM.

Figure 4:
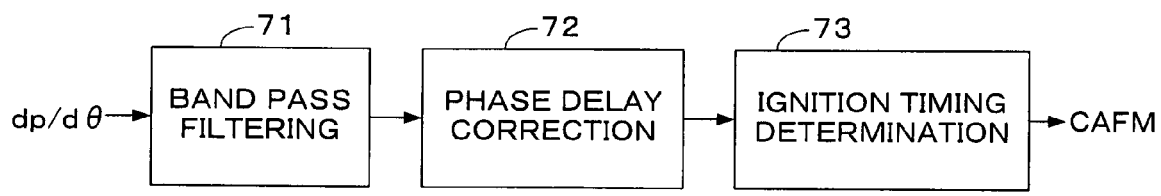
FIG. 4 is a block diagram showing an ignition timing calculating module.

FIG. 4 is a block diagram showing an ignition timing calculating module for calculating (detecting) the actual ignition timing CAFM. The function of the ignition timing calculating module is realized by the operation process executed by the CPU 14. The ignition timing calculating module includes a band pass filtering block 71, a phase delay correction block 72, and an ignition timing determination block 73. The pressure change rate dp/dθ output from the cylinder pressure sensor 2 is input to the band pass filtering block 71. In the band pass filtering block 71, a noise component is removed and the output signal is supplied to the phase delay correction block 72. The phase delay which occurs in the band pass filtering block 71 is corrected in the phase delay correction block 72.

The ignition timing determination block 73 determines that a crank angle position at which the pressure change rate dp/dθ takes a peak value corresponding to the fuel injection is the actual ignition timing CAFM. Specifically, as shown in FIG. 5(b), the crank angle position at which the pressure change rate dp/dθ output from the phase delay correction block 72 exceeds a detection threshold value DPP is determined to be the actual ignition timing CAFM.

In FIG. 5(a), a main injection pulse INJM started from a crank angle position CAIM is shown. In FIG. 5(b), an angle position range RDET (e.g., 10 degrees) where the actual ignition timing CAFM is detected is shown. By limiting the detection angle position range RDET to a comparatively narrow range, as shown in FIG. 5(b), the ignition timing is accurately determined without increasing the calculation load of the CPU 14.

Returning to FIG. 3, in step S19, the ignition delay angle DCA is converted to an ignition delay time period TDFM using the engine rotational speed NE. Further, a CET table shown in FIG. 6 is retrieved according to the ignition delay time period TDFM to calculate a cetane number CET.

According to the process of FIG. 3, when the engine is in the idling state, the power steering device is not operating, and the predetermined execution condition is satisfied. As such, the process of estimating the cetane number is performed based on the actual ignition timing CAFM of the injected fuel. Since accuracy of the cetane number estimation is reduced while the power steering is operating, the estimation process is not performed to avoid erroneous estimation of the cetane number.

Further, when the predetermined execution condition is satisfied, the clutch of the air conditioner is disengaged, and the ACG 43 is switched so as to operate in the low-voltage mode. Accordingly, the load applied from the air conditioner is removed and the load from the ACG 43 is reduced. Consequently, the accuracy of estimating the cetane number is improved.

In this embodiment, the ECU 4 is part of the fuel property estimating means, the load reducing means, the ignition timing detecting means, and the inhibiting means. The cylinder pressure sensor 2 and the crank angle position sensor 3 are a part of the fuel property estimating means and a part of the ignition timing detecting means.

The present invention is not limited to the embodiment described above, and various modifications may be made thereto. For example, in the above-described embodiment, the cylinder pressure sensor 2 is provided in all of the cylinders in the engine 1 and the process for estimating the cetane number is performed (i.e., the change in the fuel injection mode and the detection of the actual ignition timing are performed). Alternatively, the cylinder pressure sensor can be provided only in one specific cylinder, and the process for estimating the cetane number is performed with respect to the specific cylinder. Further, the cylinder subjected to the cetane number estimation process is not limited to a single cylinder. Alternatively, the cetane number estimation process may be performed, for example, in two cylinders.

Figure 7:
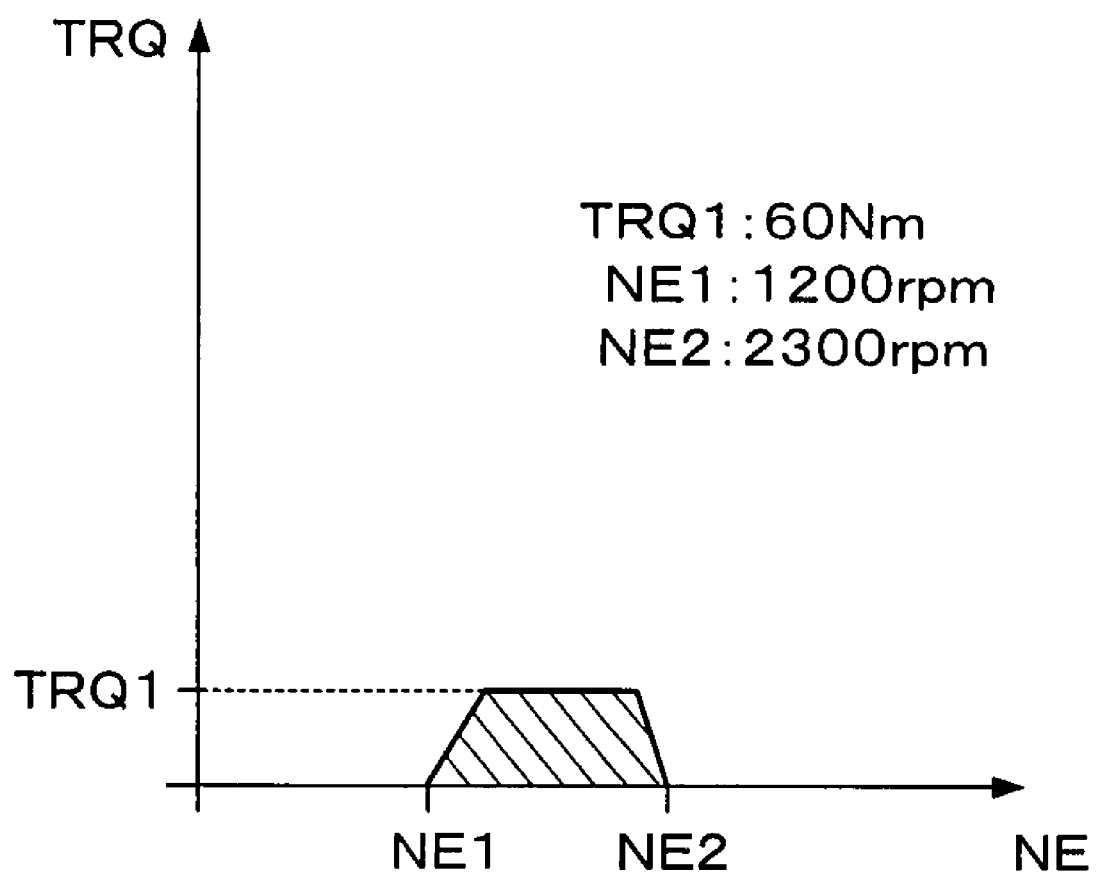
FIG. 7 is a graph illustrating a premix combustion region.

Further, in the above-described embodiment, the cetane number estimation process is performed in the idling state of the engine 1. Alternatively, the cetane number estimation process may be performed in the premix combustion region shown in FIG. 7.

Further, in the process of FIG. 3, steps S14 and S15 are executed for reducing the load on the engine. Alternatively, only one of steps S14 and S15 may be executed for reducing the load on the engine.

Further, for example, if the vehicle is provided with an electrically driven turbocharger and an electric heater, which are loads on the engine 1, and the electrically driven turbocharger and the electric heater are operating, those loads may be reduced when the cetane number estimation process is performed.

The present invention can also be applied to a control system for a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all modifications which come within the meaning and range of equivalency of the claims are, therefore, to be embraced therein.

What is claimed is:

1. A control system for an internal combustion engine, comprising:
    fuel property estimating means for injecting fuel into a combustion chamber of said engine and estimating a property of the injected fuel based on a combustion state of the injected fuel; and
    load reducing means for reducing a load applied to said engine from at least one auxiliary component and/or an air conditioner, which are both driven by said engine, when said fuel property estimating means performs the estimation of the fuel property in a predetermined low-load operating state of said engine.

2. A control system according to claim 1, wherein said fuel property estimating means includes ignition timing detecting means for detecting a compression ignition timing of the injected fuel and performs the estimation of the fuel property based on the detected compression ignition timing.

3. A control system according to claim 1, wherein said fuel property estimating means performs the estimation of the fuel property in an idling state of said engine.

4. A control system according to claim 1, further comprising inhibiting means for inhibiting the operation of the fuel property estimating means when the load applied to said engine is greater than a predetermined load.

5. A control method for an internal combustion engine, comprising the steps of:
    a) reducing a load applied to said engine from at least one auxiliary component and/or an air conditioner, which are both driven by said engine, in a predetermined low-load operating state of said engine;
    b) injecting fuel into a combustion chamber of said engine; and
    c) estimating a property of the injected fuel based on a combustion state of the injected fuel after the reduction of the load applied to said engine.

6. A control method according to claim 5, wherein said step c) includes the steps of:
    i) detecting a compression ignition timing of the injected fuel; and
    ii) performing the estimation of the fuel property based on the detected compression ignition timing.

7. A control method according to claim 5, wherein estimation of the fuel property is performed in an idling state of said engine.

8. A control method according to claim 5, further comprising the step of inhibiting estimation of the fuel property when the load applied to said engine is greater than a predetermined load.

* * * * *